Patented Mar. 11, 1952

2,588,457

UNITED STATES PATENT OFFICE 2,588,457

PRODUCTION OF CELLULOSE ESTERS

James Joseph Allen and John Arthur Hawkes, Spondon, near Derby, England, assignors to Celanese Corporation of America, a corporation of Delaware No Drawing. Application October 14, 1947, Serial No. 779,838. In Great Britain November 16, 1946

4 Claims. (Cl. 260—225)

1

This invention relates to the production of cellulose esters of higher fatty acids, i. e. of saturated or olefinic fatty acids containing at least 6 carbon atoms in the molecule.

An example of a cellulose ester of a higher fatty acid which is of technical importance is cellulose acetate-stearate. This may be made, for example, by treating an acetone-soluble cellulose acetate with a stearylating agent, especially stearic anhydride, in the presence of an esterification catalyst and an organic diluent which will dissolve the cellulose acetate-stearate as it is formed. A catalyst which gives very good results is a mixture of zinc chloride and hydrogen chloride. When esterification has proceeded to the desired degree the cellulose acetate-stearate is precipitated from the solution and is washed and dried.

If a cellulose acetate-stearate of high viscosity is required the hydrogen chloride employed as catalyst is preferably neutralized before the cellulose acetate-stearate is precipitated from the solution. For example the hydrogen chloride may be neutralized by adding to the solution sodium acetate. (In the present specification the hydrogen chloride is considered to have been neutralized when the amount of neutralizing agent added to the solution is chemically equivalent or more than equivalent to the amount of hydrogen chloride in the solution, irrespective of the actual pH value of the solution after neutralization. For example if the neutralizing agent is sodium acetate the hydrogen chloride is considered to have been neutralized when, for each molecular proportion of hydrogen chloride in the solution, at least 1 molecular proportion of sodium acetate has been added to the solution.) Besides giving a cellulose acetate-stearate of higher viscosity, neutralization has the further advantage of reducing or eliminating corrosion, for example, of the vessel employed for the precipitation, and consequent contamination of the cellulose acetate-stearate with metallic impurities. Furthermore, the stability of the cellulose acetate-stearate to heat is improved.

It has been found, however, that, while neutralization with sodium acetate gives a product of high viscosity and good stability, it also tends to give a product having a higher degree of color and haze than when the neutralization step is omitted, and for some purposes this is undesirable. The same effect is observed if the sodium acetate is replaced by magnesium or ammonium acetate or by sodium or ammonium carbonate. If the precipitated cellulose acetate-stearate is

2 subsequently washed with an aqueous alcohol to free it from contamination with stearic acid, as described in U. S. Patent No. 2,400,494, the color and haze are considerably reduced; but when a hydrocarbon washing composition is used, which, removes the contaminating stearic acid even more efficiently, the color and haze are not substantially affected.

Other cellulose esters of higher fatty acids may be made by similar methods, using the appropriate acid anhydride, and their manufacture involves the same difficulties as are described above in connection with the manufacture of cellulose acetate-stearate.

It is an object of the present invention to provide a method of producing cellulose acetate-stearate and other cellulose esters of higher fatty acids wherein the hydrogen chloride used as catalyst is neutralized before the cellulose ester is precipitated, and yet a product of low color and good clarity is obtained.

In accordance with the invention, in the production of cellulose esters of higher fatty acids by causing cellulose or a cellulose derivative containing hydroxyl groups to react with an esterifying derivative of the appropriate higher fatty acid, especially the higher fatty acid anhydride, in the presence of zinc chloride and hydrogen chloride as catalyst and of a diluent which will dissolve the cellulose ester of the higher fatty acid as it is formed and precipitating the cellulose ester of the higher fatty acid from the solution so obtained after neutralizing the hydrogen chloride in the solution, the hydrogen chloride is neutralized by means of a compound which does not introduce into the solution any metal other than zinc or any cationic radicle. (The term "cationic radicle" is employed to denote a group of atoms which is a cation in aqueous solution, e. g. ammonium or alkyl-ammonium.) Examples of suitable neutralizing agents are zinc compounds capable of neutralizing acids, e. g. zinc carbonate and especially zinc acetate and zinc salts of other fatty acids (which on reaction with hydrogen chloride give zinc chloride); olefine oxides, especially ethylene oxide (which on reaction with hydrogen chloride give chlorhydrins); and normally liquid or gaseous olefines other than ethylene, especially propylene, the butylenes and the amylenes (which react with hydrogen chloride to give monochlor-paraffin hydrocarbons). Mixtures of two or more neutralizing agents, e. g. mixtures of olefines, can be used if it is so desired.

In describing the invention in more detail it will be convenient again to refer specifically to the manufacture of cellulose acetate-stearate.

In one method of making cellulose acetate-stearate in accordance with the invention, dry acetone-soluble cellulose acetate is introduced into a solution of stearic anhydride in ethylene dichloride containing zinc chloride and hydrogen chloride as catalyst, and the mixture is stirred or otherwise agitated until a moderately clear solution of cellulose acetate-stearate has been formed. Zinc acetate, preferably in powder form or dissolved in warm acetic acid, or ethylene oxide or propylene, a butylene or an amylene (or a mixture of two or more of these olefines) dissolved in cold ethylene dichloride, may then be added to the solution, or ethylene oxide or one or more of the same olefines, may be fed under the surface of the solution which in each method is preferably well stirred; the amount of zinc acetate or other neutralizing agent added is at least equivalent to the hydrogen chloride. The cellulose acetate-stearate is then precipitated by adding to the solution sufficient hot water to cause most of the ethylene dichloride to boil off together with any other low-boiling constituents of the mixture and at the same time to remove from the cellulose acetate-stearate zinc chloride and any other water-soluble constituents of the mixture. The precipitated cellulose acetate-stearate is then separated from the aqueous liquid, e. g. by filtration or decantation, is washed, preferably with petrol or some other hydrocarbon composition boiling between about 60° and 200° C. or with an ether, and dried.

Cellulose acetate-stearate made by the process of the invention is not only superior in color and clarity to cellulose acetate-stearate made by the same process except that the hydrogen chloride is neutralized with a sodium, magnesium or ammonium compound; it is also superior in color to cellulose acetate-stearate made without neutralizing the hydrogen chloride, besides having a higher viscosity and being considerably more stable to heat as, for example, in molding operations.

Although the invention has been described with particular reference to cellulose acetate-stearate it may be applied to the production of high quality cellulose esters of higher fatty acids in general, both saturated and unsaturated. Examples of such esters are simple esters, e. g. cellulose laurate, palmitate, stearate and oleate, which can be made by the action of the appropriate fatty acid anhydride on cellulose, and especially mixed esters such as cellulose acetate-palmitate and cellulose propionate-stearate, which can be made by the action of the higher fatty acid anhydride on a lower fatty acid cellulose ester containing free hydroxyl groups.

The invention is illustrated by the following examples. The "parts" given are parts by weight.

*Example 1*

74 parts of acetone-soluble cellulose acetate is added to a solution of 88 parts of stearic acid anhydride in 433 parts of ethylene dichloride containing as catalyst 0.18 part of zinc chloride and 0.36 part of hydrogen chloride. As the reaction proceeds the temperature of the mixture rises to some extent and the cellulose acetate-stearate produced eventually dissolves to form a clear solution. About 1 part of finely powdered anhydrous zinc acetate is then thoroughly stirred into the solution. Boiling water is then added to vaporize the ethylene dichloride and precipitate the cellulose acetate-stearate, and the precipitate is drained until a wet crude cellulose acetate-stearate is obtained containing 1 part of solid to 4 parts of liquid. The wet crude product is then washed batchwise with petrol at 50° C., each wash lasting for 15 minutes, during which the petrol and ester are stirred.

The first wash is performed with petrol which has already been used in 5 previous washes, the second with petrol which has been used four times before, and so on; the sixth and each succeeding wash is performed with petrol which is initially free from stearic acid. In each case the amount of petrol used is about twice the weight of the wet crude ester before the first wash. After the tenth wash the cellulose acetate stearate, now substantially free from uncombined stearic acid, is dried in a current of heated air.

The extracts from the first, seventh, eighth, ninth and tenth washes are combined, passed through a bed of fuller's-earth to remove colored and metallic impurities, and distilled from an enamelled still. The last traces of petrol are removed by injecting live steam into the still base. The residue consists of stearic acid which is sufficiently pure to be converted into stearic anhydride suitable for the production of further cellulose acetate stearate.

*Example 2*

Cellulose acetate is caused to react with stearic anhydride, as described in Example 1, so as to form a clear solution of cellulose acetate-stearate in ethylene dichloride. 0.5 part of ethylene oxide dissolved in ethylene dichloride at about 0° C. is now added with vigorous stirring. Boiling water is then added to vaporize most of the ethylene dichloride and precipitate the cellulose acetate-stearate. The precipitate is drained and washed as described in Example 1.

*Example 3*

The procedure of Example 2 is followed, except that, instead of being added in solution in ethylene dichloride, ethylene oxide in the gas phase is fed to the bottom of the vessel containing the esterification solution, the solution being well stirred throughout, until substantially no free hydrogen chloride remains.

*Example 4*

The procedure of Example 2 or 3 is followed, except that the ethylene oxide is replaced by about the same quantity of propylene.

Cellulose acetate-stearate prepared in accordance with these examples has a clarity about as good as or slightly better, and a substantially better color, than cellulose acetate-stearate made by the same method but without neutralizing the hydrogen chloride. If the neutralization is effected with sodium acetate or magnesium acetate the clarity is considerably lower.

Having described our invention, what we desire to secure by Letters Patent is:

1. In the manufacture of mixed cellulose esters of higher and lower fatty acids by the action of a higher fatty acid anhydride on an acetone-soluble partial cellulose ester of a lower fatty acid having 2 to 3 carbon atoms in the molecule in the presence of zinc chloride and hydrogen chloride as catalyst and a solvent for the mixed cellulose ester in amount sufficient to dissolve the said ester, the step of adding to the esterification solution, as the operation next before precipitating the cellulose ester, a zinc salt of an acid weaker than hydrochloric acid in amount at least equivalent to the hydrogen chloride in the solution.

2. In the manufacture of mixed cellulose esters of higher fatty acids and acetic acid by the action of a higher fatty acid anhydride on an acetone-soluble cellulose acetate in the presence of zinc chloride and hydrogen chloride as catalyst and a solvent for the mixed cellulose ester in amount sufficient to dissolve the said ester, the step of adding to the esterification solution, as the operation next before precipitating the cellulose ester, a zinc salt of an acid weaker than hydrochloric acid in amount at least equivalent to the hydrogen chloride in the solution.

3. In the manufacture of mixed cellulose esters of higher fatty acids and acetic acid by the action of a higher fatty acid anhydride on an acetone-soluble cellulose acetate in the presence of zinc chloride and hydrogen chloride as catalyst and a solvent for the mixed cellulose ester in amount sufficient to dissolve the said ester, the step of adding to the esterification solution, as the operation next before precipitating the cellulose ester, zinc acetate in amount at least equivalent to the hydrogen chloride in the solution.

4. In the manufacture of cellulose acetate stearate by the action of stearic anhydride on an acetone-soluble cellulose acetate in the presence of zinc chloride and hydrogen chloride as catalyst and of a solvent for the cellulose acetate stearate in amount sufficient to dissolve it, the step of adding to the esterification solution, as the operation next before precipitating the cellulose acetate stearate, zinc acetate in amount at least equivalent to the hydrogen chloride in the solution.

JAMES JOSEPH ALLEN.
JOHN ARTHUR HAWKES.

REFERENCES CITED

The following references are of record in the file of this patent:

UNITED STATES PATENTS

| Number | Name | Date |
|---|---|---|
| 2,316,215 | Austin | Apr. 13, 1943 |
| 2,400,494 | Fisher | May 21, 1946 |
| 2,404,503 | Kharasch et al. | July 23, 1946 |
| 2,432,153 | Haney et al. | Dec. 9, 1947 |
| 2,470,191 | Seymour et al. | May 17, 1949 |

FOREIGN PATENTS

| Number | Country | Date |
|---|---|---|
| 543,311 | Great Britain | Feb. 19, 1942 |

OTHER REFERENCES

Karrer Nordemann Publishing Co., Inc., New York, N. Y., 1938, page 49 and page 219, "Organic Chemistry."